United States Patent
Hommura et al.

(10) Patent No.: US 8,361,677 B2
(45) Date of Patent: Jan. 29, 2013

(54) MEMBRANE/ELECTRODE ASSEMBLY FOR POLYMER ELECTROLYTE FUEL CELL

(75) Inventors: Satoru Hommura, Chiyoda-ku (JP); Tetsuji Shimohira, Chiyoda-ku (JP); Takashi Saeki, Chiyoda-ku (JP); Susumu Saito, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 1471 days.

(21) Appl. No.: 11/875,393

(22) Filed: Oct. 19, 2007

(65) Prior Publication Data
US 2009/0042067 A1    Feb. 12, 2009

(30) Foreign Application Priority Data
Oct. 23, 2006    (JP) .................. 2006-287789

(51) Int. Cl.
H01M 4/02    (2006.01)
H01M 4/36    (2006.01)
H01M 4/92    (2006.01)

(52) U.S. Cl. ............... 429/529; 429/523; 429/530

(58) Field of Classification Search ............ 429/529, 429/530
See application file for complete search history.

(56) References Cited

U.S. PATENT DOCUMENTS
2004/0121211 A1*    6/2004    Asano et al. ............... 429/33

FOREIGN PATENT DOCUMENTS

| | | |
|---|---|---|
| JP | 6-260185 | 9/1994 |
| JP | 9-102322 | 4/1997 |
| JP | 2004-273257 | 9/2004 |
| JP | 2004-359925 | 12/2004 |
| JP | 2005-139432 | 6/2005 |
| JP | 2005-139450 | 6/2005 |
| JP | 2005-158646 | 6/2005 |
| JP | 2005-166598 | 6/2005 |
| JP | 2006-147164 | 6/2006 |
| JP | 2006-147165 | 6/2006 |
| JP | 2006-147478 | 6/2006 |
| WO | WO 2005/029624 | 3/2005 |
| WO | WO 2005/101428 A1 | 10/2005 |
| WO | WO 2007/013532 A1 | 2/2007 |
| WO | WO 2007/013533 A1 | 2/2007 |

OTHER PUBLICATIONS

U.S. Appl. No. 11/771,414, filed Jun. 29, 2007, Tetsuji Shimohira, et al.
U.S. Appl. No. 11/771,332, filed Jun. 29, 2007, Tetsuji Shimohira, et al.
U.S. Appl. No. 11/971,450, filed Jan. 9, 2008, Hommura, et al.
U.S. Appl. No. 12/533,667, filed Jul. 31, 2009, Hommura, et al.

* cited by examiner

Primary Examiner — Barbara Gilliam
Assistant Examiner — Steven Scully
(74) Attorney, Agent, or Firm — Oblon, Spivak, McClelland, Maier & Neustadt, L.L.P.

(57) ABSTRACT

A membrane/electrode assembly for a polymer electrolyte fuel cell, comprising an anode and a cathode each having a catalyst layer containing a proton conductive polymer, and a polymer electrolyte membrane disposed between the anode and the cathode, wherein the proton conductive polymer has an electrical conductivity of at least 0.07 S/cm at a temperature of 80° C. at a relative humidity of 40% and has a water content less than 150 mass %.

14 Claims, 2 Drawing Sheets

MEMBRANE/ELECTRODE ASSEMBLY FOR POLYMER ELECTROLYTE FUEL CELL

BACKGROUND OF THE INVENTION

1. Field of the Invention

The present invention relates to a membrane/electrode assembly for a polymer electrolyte fuel cell.

2. Discussion of Background

In recent years, a polymer electrolyte fuel cell is required to be operated in higher temperature and lower humidity environment especially for automobiles. Accordingly, as a proton conductive polymer contained in a polymer electrolyte membrane and a catalyst layer of a membrane/electrode assembly, a material exhibiting high electrical conductivity in a low humidity environment has been desired.

To improve electrical conductivity of a proton conductive polymer, the number of ionic groups should be increased. However, an increase of ionic groups increases the water content of the proton conductive polymer. If the water content of the proton conductive polymer to be used for a catalyst layer is too high, the proton conductive polymer will swell, whereby air gaps in the catalyst layer may be clogged. As a result, the diffusability of a gas to be supplied will decrease, whereby a so-called flooding phenomenon such that the power generation performance of a polymer fuel cell remarkably decreases will occur.

As a proton conductive polymer to be used for a catalyst layer, the following polymers have been proposed.

(1) A copolymer of tetrafluoroethylene with $CF_2=CF-(OCF_2CFX^1)_m-O_q-(CF_2)_n-A$ (wherein $X^1$ is a fluorine atom or a trifluoromethyl group, m is an integer of from 0 to 3, n is an integer of from 1 to 12, q is 0 or 1, and A is a sulfonic acid type functional group) (Patent Document 1).

(2) A copolymer represented by $-[CF_2-CF_2]_{1.00}-[CF_2-CF(-O(CF_2)_2-SO_3H)]_{2.19}-$ (Patent Document 2).

The polymer (1) is a polymer having a very high water content so as to maintain high electrical conductivity in a low humidity environment, whereby flooding is likely to occur.

The polymer (2) has insufficient electrical conductivity, and if the ion exchange capacity of the polymer is increased so as to increase the electrical conductivity, it will have a too high water content, whereby flooding is likely to occur.

Patent Document 1: JP-A-6-260185
Patent Document 2: JP-A-2004-273257

SUMMARY OF THE INVENTION

Under these circumstances, it is an object of the present invention to provide a membrane/electrode assembly for a polymer electrolyte fuel cell exhibiting high power generation performance in high temperature and low humidity environment.

The present invention has been made to accomplish the above object and provides a membrane/electrode assembly for a polymer electrolyte fuel cell, comprising an anode and a cathode each having a catalyst layer containing a proton conductive polymer, and a polymer electrolyte membrane disposed between the anode and the cathode, wherein the proton conductive polymer has an electrical conductivity of at least 0.07 S/cm at a temperature of 80° C. at a relative humidity of 40% and has a water content less than 150 mass %.

The proton conductive polymer preferably has an electrical conductivity of at least 0.08 S/cm at a temperature of 80° C. under a relative humidity of 40%.

The proton conductive polymer is preferably a fluoropolymer.

The fluoropolymer preferably has repeating units having a group represented by the following formula (α):

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, X is an oxygen atom, a nitrogen atom or a carbon atom, "a" is 0 when X is an oxygen atom, 1 when X is a nitrogen atom and 2 when X is a carbon atom, and Y is a fluorine atom or a monovalent perlfluoroorganic group.

The fluoropolymer preferably has repeating units based on a monomer having a group represented by the above formula (α) and tetrafluoroethylene.

The membrane/electrode assembly for a polymer electrolyte fuel cell of the present invention is preferably used for a polymer electrolyte fuel cell to carry out power generation by supplying an air at a relative humidity of at most 40% to the cathode.

The polymer electrolyte fuel cell preferably carries out heat generation while the temperature of the membrane/electrode assembly is maintained at 90° C. or higher.

The present invention further provides a method of operating a polymer electrolyte fuel cell having the membrane/electrode assembly for a polymer electrolyte fuel cell of the present invention, which comprises power generation by supplying an air at a relative humidity of at most 40% to the cathode while the temperature of the membrane/electrode assembly is maintained at 90° C. or higher.

The present invention still further provides a liquid composition comprising a dispersion medium and a proton conductive polymer dispersed in the dispersion medium, wherein the proton conductive polymer has an electrical conductivity of at least 0.07 S/cm at a temperature of 80° C. at a relative humidity of 40% and has a water content less than 150 mass %, and the dispersion medium contains an organic solvent having a hydroxyl group and water.

The membrane/electrode assembly for a polymer electrolyte fuel cell of the present invention can exhibit high power generation performance in high temperature and low humidity environment.

According to the method of operating a polymer electrolyte fuel cell of the present invention, a polymer electrolyte fuel cell can exhibit high power generation performance in high temperature and low humidity environment.

According to the liquid composition of the present invention, the membrane/electrode assembly for a polymer electrolyte fuel cell of the present invention can easily be obtained.

DETAILED DESCRIPTION OF THE PREFERRED EMBODIMENTS

In the present specification, a group represented by the formula (α) will be referred to as a group (α). The same applies to a group represented by another formula. Further, a compound represented by the formula (1) will be referred to as a compound (1). The same applies to a compound represented by another formula.

Membrane-Electrode Assembly

Figure 1:
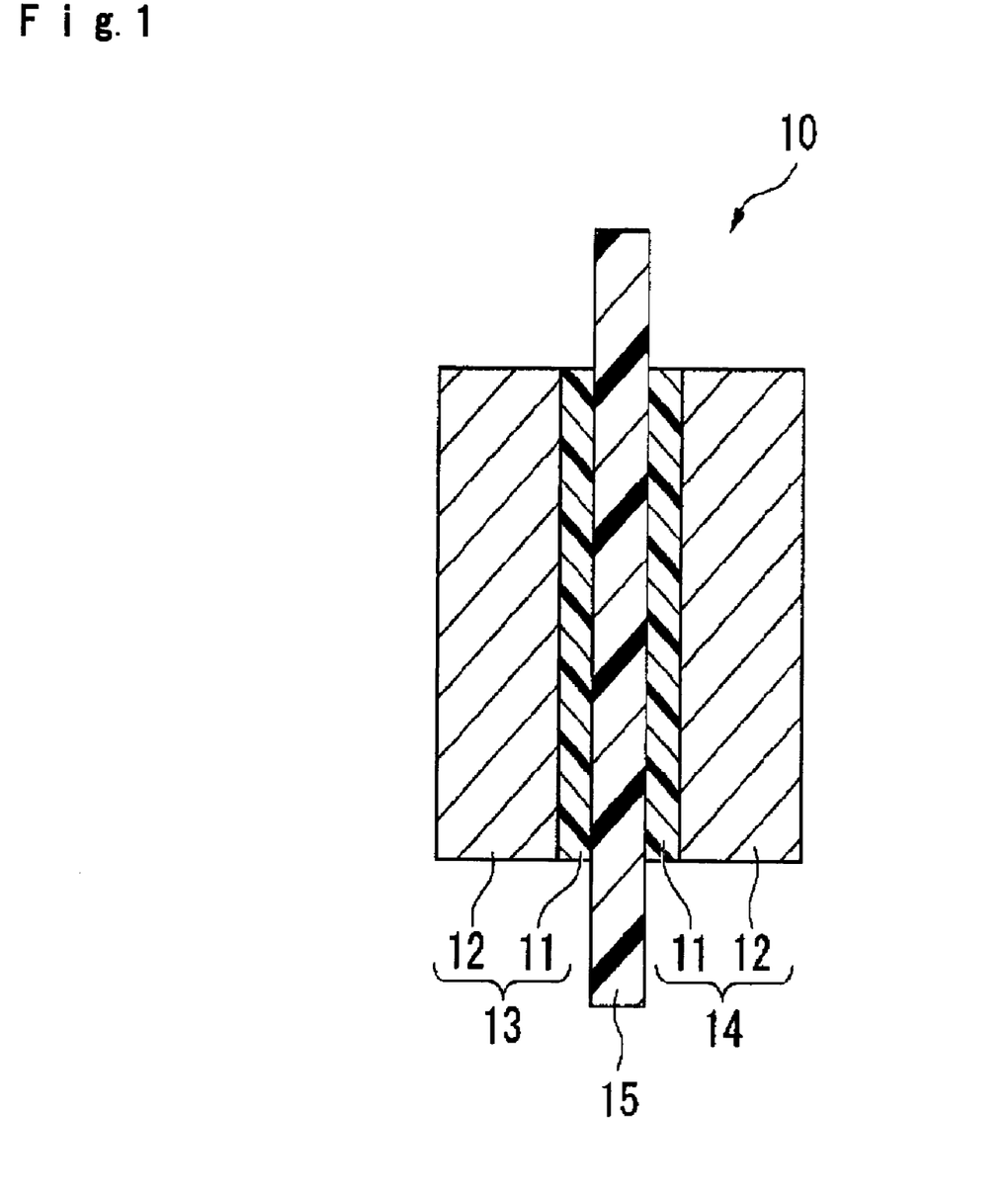
FIG. 1 is a cross-section illustrating one example of the membrane/electrode assembly of the present invention.

FIG. 1 is a cross-section illustrating one example of a membrane/electrode assembly for a polymer electrolyte fuel cell of the present invention (hereinafter referred to as a membrane/electrode assembly). A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and a proton conductive polymer.

The catalyst may be a catalyst having platinum or a platinum alloy supported on a carbon support. The catalyst for the cathode 14 is preferably a catalyst having a platinum/cobalt alloy supported on a carbon support.

The carbon support may be a carbon black powder, and it is preferably a carbon black powder graphitized by e.g. heat treatment in view of durability.

The electrical conductivity of the proton conductive polymer at a temperature of 80° C. at a relative humidity of 40% is at least 0.07 S/cm, preferably at least 0.08 S/cm. When the electrical conductivity of the proton conductive polymer is at least 0.07 S/cm, a membrane/electrode assembly can exhibit high power generation performance even when power generation is carried out in high temperature and low humidity environment, specifically, by supplying an air at a relative humidity of at most 40% to the cathode while the temperature of the membrane/electrode assembly is maintained at 90° C. or higher.

To increase the electrical conductivity of the proton conductive polymer in the catalyst layer 11 is effective to improve the cell voltage particularly in a low humidity environment, by the following two effects. First is an effect of reducing the ohmic loss of the catalyst layer 11. The ohmic loss of the catalyst layer 11 is greatly influenced by the electrical conductivity of the proton conductive polymer in the catalyst layer 11 particularly in a low humidity environment. The second is an effect of reducing the reaction overvoltage in the catalyst layer 11. The reaction overvoltage in the catalyst layer 11 tends to be high in a low humidity environment, and it can be remarkably reduced by use of a proton conductive polymer having high electrical conductivity.

The electrical conductivity of the proton conductive polymer is determined by the following method.

To a film with a width of 5 mm comprising the proton conductive polymer, a substrate having four terminal electrodes disposed with a distance of 5 mm was closely contacted, and by a known four terminal method, the resistance of the film is measured under constant temperature and constant humidity conditions at a temperature of 80° C. at a relative humidity of 40% at an alternating current of 10 kHz at a voltage of 1 V, to calculate the electrical conductivity from the result.

The water content of the proton conductive polymer is less than 150 mass %, preferably less than 140 mass %, more preferably less than 130 mass %. If the water content of the proton conductive polymer is less than 150 mass %, swelling of the proton conductive polymer will be suppressed, whereby flooding is likely to occur, and a decrease of power generation performance will be suppressed.

The water content of the proton conductive polymer is determined by the following method.

The proton conductive polymer is immersed in warm water at 80° C. for 16 hours, and the proton conductive polymer together with the warm water is cooled to room temperature. The proton conductive polymer is taken out from the water, water droplets attached to the surface are wiped off, and then the mass of the proton conductive polymer containing water is immediately measured. Then, the proton conductive polymer is put in a glove box and left to stand in an atmosphere through which dry nitrogen flows for 24 hours or longer to dry the proton conductive polymer. Then, the dry mass of the proton conductive polymer is measured in the glove box. The difference between the mass of the proton conductive polymer containing water and the dry mass corresponds to the mass of water absorbed by the proton conductive polymer. The water content of the proton conductive polymer is determined from the following formula:

Water content={(mass of water absorbed by the proton conductive polymer)/(dry mass of the proton conductive polymer)}×100

In a case where the proton conductive polymer is a liquid composition described hereinafter, the liquid composition is applied to an appropriate substrate, dried and heat treated to form it into a film and then its water content is determined. The heat treatment temperature is preferably from 180 to 200° C. If the heat treatment temperature is too low, the polymer skeleton may not be stabilized, whereby a water content higher than the original water content may be obtained depending upon the type of the proton conductive polymer. If the heat treatment temperature is too high, thermal decomposition of ionic groups may start, whereby a water content lower than the original water content may be obtained.

The proton conductive polymer is preferably a fluoropolymer which is excellent in chemical durability and which can secure performance of a catalyst layer stably for a long time.

The fluoropolymer is preferably a polymer (hereinafter referred to as a polymer Q) having repeating units having the group (α):

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, X is an oxygen atom, a nitrogen atom or a carbon atom, "a" is 0 when X is an oxygen atom, 1 when X is a nitrogen atom and 2 when X is a carbon atom, and Y is a fluorine atom or a monovalent perlfluoroorganic group.

When the perfluoroalkylene group as each of $Q^1$ and $Q^2$ has an etheric oxygen atom, the number of oxygen atom may be one or more. Further, such an oxygen atom may be inserted in the carbon atom-carbon atom bond of the perfluoroalkylene group or may be inserted at the terminal of the carbon atom bond.

The perfluoroalkylene group may be linear or branched, and is preferably linear.

The number of carbon atoms in the perfluoroalkylene group is preferably from 1 to 6, more preferably from 1 to 4.

If the number of carbon atoms is too large, the boiling point of the fluoromonomer tends to be high, whereby purification by distillation tends to be difficult. Further, if the number of carbon atoms is too large, the ion exchange capacity of the polymer Q tends to decrease, thus lowering the electrical conductivity.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability in power generation performance will be achieved when a polymer electrolyte fuel cell is operated over a long period of time as compared with a case where $Q^2$ is a single bond.

At least one of $Q^1$ and $Q^2$ is preferably a $C_{1-6}$ perfluoroalkylene group having an etheric oxygen atom. A fluoromonomer having a $C_{1-6}$ perfluoroalkylene group having an etheric oxygen atom can be prepared without fluorination reaction with a fluorine gas, and accordingly its production is easy with high yield.

The —$SO_2X(SO_2R^{f1})_a^-H^+$ group may be a sulfonic acid group (—$SO_3^-H^+$ group), a sulfonimide group (—$SO_2N(SO_2R^{f1})^-H^+$ group) or a sulfonmethide group (—$SO_2C(SO_2R^{f1})_2^-H^+$ group).

The perfluoroalkyl group as $R^{f1}$ may be linear or branched, and is preferably linear. The number of carbon atoms in $R^{f1}$ is preferably from 1 to 6, more preferably from 1 to 4. $R^{f1}$ may, for example, be preferably a perfluoromethyl group or a perfluoroethyl group.

In the case of a sulfonmethide group, the two $R^{f1}$'s may be the same groups or different groups.

Y is preferably a fluorine atom or a $C_{1-6}$ linear perfluoroalkyl group which may have an etheric oxygen atom.

The polymer Q is preferably a perfluoropolymer in view of chemical durability.

The polymer Q may further have repeating units based on another monomer described hereinafter. Among repeating units based on another monomer, preferred are repeating units based on a perfluoromonomer, more preferred are repeating units based on tetrafluoroethylene in view of chemical durability.

The polymer Q can be produced, for example, by the following steps.

(I) A step of polymerizing a monomer (hereinafter referred to as a compound (m1)) having a group (β) with another monomer as the case requires to obtain a precursor polymer (hereinafter referred to as a polymer P) having —$SO_2F$ groups:

(β)

(II) A step of bringing the polymer P and a fluorine gas into contact with each other as the case requires to fluorinate unstable terminal groups of the polymer P.

(III) A step of converting the —$SO_2F$ groups of the polymer P to sulfonic acid groups, sulfonimide groups or sulfonmethide groups to obtain a polymer Q.

Step (I):

The compound (m1) can be obtained, for example, by Preparation Examples shown in Examples 1 and 2 described hereinafter.

Such another monomer may, for example, be tetrafluoroethylene, chlorotrifluoroethylene, vinylidene fluoride, hexafluoropropylene, trifluoroethylene, vinyl fluoride, ethylene, $CF_2$=$CFOR^{f2}$, $CH_2$=$CFR^{f3}$ or $CH_2$=$CHCH_2R^{f3}$, wherein $R^{f2}$ is a $C_{1-12}$ perfluoroalkyl group which may contain an etheric oxygen atom, and $R^{f3}$ is a $C_{1-12}$ perfluoroalkyl group.

Among such other monomers, preferred is a perfluoromonomer, more preferred is tetrafluoroethylene in view of chemical durability.

The polymerization method may be a known polymerization method such as a bulk polymerization method, a solution polymerization method, a suspension polymerization method or an emulsion polymerization method.

The polymerization is carried out under conditions under which radicals will form. As a method of forming radicals, irradiation with radiation rays such as ultraviolet rays, γ rays or electron rays or addition of an initiator may, for example, be mentioned.

The polymerization temperature is usually from 20 to 150° C.

The initiator may, for example, be a bis(fluoroacyl) peroxide, a bis(chlorofluoroacyl) peroxide, a dialkyl peroxydicarbonate, a diacyl peroxide, a peroxyester, an azo compound or a persulfate, and with a view to obtaining a polymer P having a small number of unstable terminal groups, preferred is a perfluoro compound such as a bis(fluoroacyl) peroxide.

A solvent used in the solution polymerization method may, for example, be a polyfluorotrialkylamine compound, a perfluoroalkane, a hydrofluoroalkane, a chlorofluoroalkane, a fluoroolefin having no double bond at a molecular chain terminal, a polyfluorocycloalkane, a polyfluorocyclic ether compound, a hydrofluoroether, a fluorinated low molecular weight polyether or t-butanol.

Step (II):

The unstable terminal group is a group formed by the chain transfer reaction, a group derived from the radical initiator, or the like, and specifically it is a —COOH group, a —CF=$CF_2$ group, a —COF group, a —$CF_2H$ group or the like. By fluorinating such unstable terminal groups, decomposition of the polymer Q will be suppressed.

The fluorine gas may be diluted with an inert gas such as nitrogen, helium or carbon dioxide or may be used as it is without being diluted.

The temperature at which the polymer P and the fluorine gas are brought into contact with each other is preferably from room temperature to 300° C., more preferably from 50 to 250° C., furthermore preferably from 100 to 220° C., particularly preferably from 150 to 200° C.

The time over which the polymer P and the fluorine gas are in contact with each other is preferably from one minute to one week, more preferably from 1 to 50 hours.

Step (III):

For example, in a case where the —$SO_2F$ groups are converted to sulfonic acid groups, step (III-1) is carried out, and when the —$SO_2F$ groups are converted to sulfonimide groups, step (III-2) is carried out.

(III-1) A step of hydrolyzing the —$SO_2F$ groups of the polymer P into a sulfonate, and converting the sulfonate to an acid form to obtain sulfonic acid groups.

(III-2) A step of forming the —$SO_2F$ groups of the polymer P into sulfonimide thereby to convert these groups to sulfonimide groups.

Step (III-1):

The hydrolysis is carried out, for example, by bringing the polymer P and a basic compound into contact with each other in a solvent.

The basic compound may, for example, be sodium hydroxide or potassium hydroxide. The solvent may, for example, be water or a solvent mixture of water and a polar solvent. The polar solvent may, for example, be an alcohol (such as methanol or ethanol) or dimethyl sulfoxide.

The conversion to an acid form is carried out, for example, by bringing the polymer P having the —SO$_3$F groups hydrolyzed into contact with an aqueous solution of e.g. hydrochloric acid or sulfuric acid.

The hydrolysis and the conversion to an acid form are carried out usually at from 0 to 120° C.

Step (III-2):

The formation into sulfonimide may be carried out by a known method such as a method disclosed in U.S. Pat. No. 5,463,005, or a method disclosed in Inorg. Chem. 32 (23), p. 5007 (1993).

The catalyst layer 11 may contain a water repellent with a view to increasing the effect of suppressing flooding. The water repellent may, for example, be a tetrafluoroethylene/hexafluoropropylene copolymer, a tetrafluoroethylene/perfluoro(alkyl vinyl ether) copolymer or polytetrafluoroethylene. The water repellent is preferably a fluoropolymer soluble in a solvent, with a view to easily carrying out water repellent treatment of the catalyst layer 11. The amount of the water repellent is preferably from 0.01 to 30 mass % in the catalyst layer 11 (100 mass %).

(Gas Diffusion Layer)

The gas diffusion layer 12 may, for example, be carbon paper, carbon cloth or carbon felt.

The gas diffusion layer 12 is preferably subjected to water repellent treatment with e.g. polytetrafluoroethylene.

(Polymer Electrolyte Membrane)

The polymer electrolyte membrane 15 may be a membrane of an ion exchange resin.

The ion exchange resin may, for example, be the same proton conductive polymer as for the catalyst layer 11, or another proton conductive polymer other than such a proton conductive polymer. Such another proton conductive polymer may, for example, be another fluoropolymer other than the polymer Q or a hydrocarbon polymer, and is preferably another fluoropolymer in view of durability.

Such another fluoropolymer is particularly preferably a copolymer having repeating units based on tetrafluoroethylene and repeating units having a fluorinated structure having a sulfonic acid group.

The repeating units having a fluorinated structure having a sulfonic acid group are preferably the following units (1):

(1)

wherein X$^1$ is a fluorine atom or a trifluoromethyl group, m is an integer of from 0 to 3, n is an integer of from 1 to 12, and q is 0 or 1.

The hydrocarbon polymer may, for example, be sulfonated polyarylene, sulfonated polybenzoxazole, sulfonated polybenzothiazole, sulfonated polybenzimidazole, sulfonated polysulfone, sulfonated polyethersulfone, sulfonated polyether ethersulfone, sulfonated polyphenylenesulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone ketone or sulfonated polyimide.

(Carbon Layer)

Figure 2:
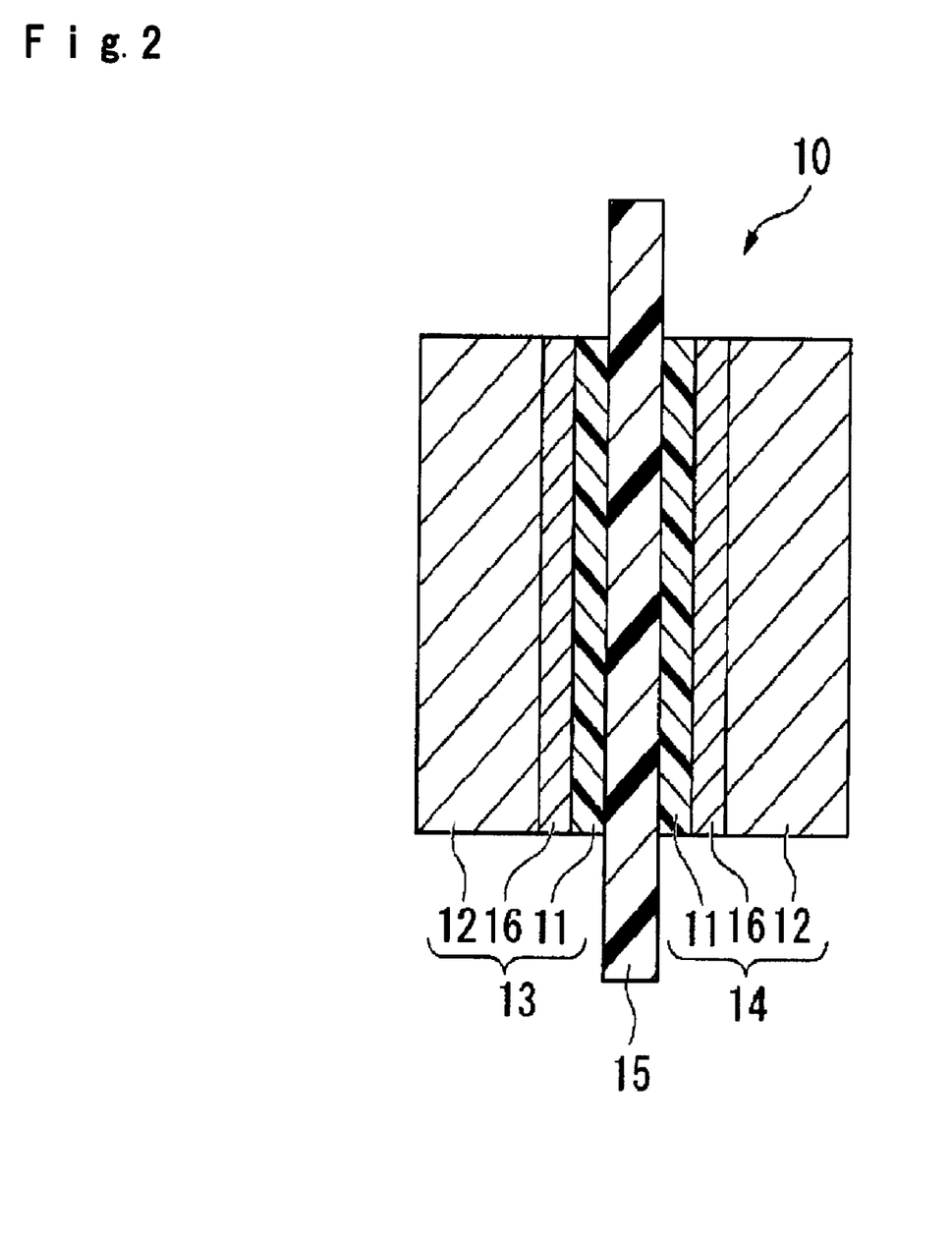
FIG. 2 is a cross-section illustrating another example of the membrane/electrode assembly of the present invention.

The membrane/electrode assembly 10 may have carbon layers 16 each between the catalyst layer 11 and the gas diffusion layer 12 as shown in FIG. 2. By disposing the carbon layers 16, the gas diffusability on the surface of the catalyst layers 11 will improve, whereby the power generation performance of the polymer electrolyte fuel cell will remarkably improve.

The carbon layer 16 is a layer containing carbon and a nonionic fluoropolymer.

The carbon is preferably carbon nanofibers having a fiber diameter of from 1 to 1,000 nm and a fiber length of at most 1,000 μm.

The nonionic fluoropolymer may, for example, be polytetrafluoroethylene.

(Process for Producing Membrane/Electrode Assembly)

The membrane/electrode assembly 10 is produced, for example, by the following process.

(a-1) A process of forming catalyst layers 11 on a polymer electrolyte membrane 15 to prepare a membrane/catalyst layer assembly, and sandwiching the membrane/catalyst layer assembly between gas diffusion layers 12.

(a-2) A process of forming a catalyst layer 11 on a gas diffusion layer 12 to prepare electrodes (anode 13, cathode 14) and sandwiching a polymer electrolyte membrane 15 between the electrodes.

In a case where the membrane/electrode assembly 10 has carbon layers 16, the membrane/electrode assembly 10 is produced, for example, by the following process.

(b-1) A process of applying a dispersion liquid containing carbon and a nonionic fluoropolymer to a substrate film and drying the dispersion liquid to form a carbon layer 16, forming a catalyst layer 11 on the carbon layer 16, bonding such catalyst layers 11 and a polymer electrolyte membrane 15, separating the substrate films to prepare a membrane/catalyst layer assembly having carbon layers 16, and sandwiching the membrane/catalyst layer assembly between gas diffusion layers 12.

(b-2) A process of applying a dispersion liquid containing carbon and a nonionic fluoropolymer to a gas diffusion layer 12 and drying the dispersion liquid to form a carbon layer 16, and sandwiching a membrane/catalyst layer assembly in the process (a-1) between such gas diffusion layers 12 each having a carbon layer 16.

The polymer electrolyte membrane 15 is produced, in a case where the ion exchange resin is the polymer Q, by the following process.

(x-1) A process of forming the polymer P into a membrane, and then carrying out the above step (III).

(x-2) A process of forming the polymer Q obtained in the above step (III) into a membrane.

The forming method may, for example, be a casting method.

As a process for forming the catalyst layer 11, the following processes may be mentioned.

(y-1) A process of applying a liquid for forming a catalyst layer to a polymer electrolyte membrane 15, a gas diffusion layer 12 or a carbon layer 16 and drying the liquid.

(y-2) A process of applying a liquid for forming a catalyst layer to a substrate film and drying the liquid to form a catalyst layer 11, and transferring the catalyst layer 11 to a polymer electrolyte membrane 15.

The liquid for forming a catalyst layer is a liquid having a proton conductive polymer and a catalyst dispersed in a dispersion medium. The liquid for forming a catalyst layer may be prepared, for example, by mixing a liquid composition described hereinafter with a dispersion liquid of the catalyst.

The viscosity of the liquid for forming a catalyst layer varies depending upon the process for forming a catalyst layer 11 and accordingly the liquid may be a dispersion liquid having a viscosity of several tens cP or may be a paste having a viscosity of about 20,000 cP.

The liquid for forming a catalyst layer may contain a thickener to adjust the viscosity. The thickener may be ethyl cellulose, methyl cellulose, a cellosolve thickener or a fluorinated solvent (such as pentafluoropropanol or flon).

To stabilize the proton conductive polymer in the catalyst layer 11, it is preferred to carry out heat treatment after the polymer electrolyte membrane 15 and the catalyst layer 11 are bonded. The heat treatment temperature varies depending upon the type of the proton conductive polymer but is preferably from 130 to 200° C. If the heat treatment temperature is too low, the water content of the proton conductive polymer tends to be high, whereby gas diffusability in the catalyst layer 11 may decrease, thus lowering power generation performance. If the heat treatment temperature is too high, heat decomposition of ionic groups may start, whereby the electrical conductivity will decrease, thus lowering power generation performance. Further, if the heat treatment temperature exceeds 170° C., the carbon support may undergo oxidative destruction depending upon the type of the catalyst. Accordingly, heat treatment is carried out preferably in such an environment that oxygen in the catalyst layer 11 is reduced in a nitrogen atmosphere under reduced pressure or under elevated pressure by pressing. Further, to suppress oxidative destruction, a carbon support graphitized by heat treatment or the like may be used as the carbon support.

The above-described membrane/electrode assembly 10 can exhibits high power generation performance in high temperature and low humidity environment since the proton conductive polymer contained in the catalyst layer 11 is a proton conductive polymer having an electrical conductivity of at least 0.07 S/cm at a temperature of 80° C. at a relative humidity of 40% and having a water content less than 150 mass %, i.e. capable of exhibiting high electrical conductivity in low humidity environment. Specifically, high power generation performance can be exhibited even when the relative humidity of an air supplied to the cathode 14 is at most 40% and the temperature of the membrane/electrode assembly is maintained at 90° C. or higher.

Method of Operating Polymer Electrolyte Fuel Cell

The membrane/electrode assembly of the present invention is used for a polymer electrolyte fuel cell. A polymer electrolyte fuel cell is produced, for example, by sandwiching the membrane/electrode assembly between two separators to form a cell, and stacking such a plurality of cells.

The separator may, for example, be an electrically conductive carbon plate having grooves formed to constitute flow paths for a fuel cell or an oxidizing gas containing oxygen (such as air or oxygen).

The type of the polymer electrolyte fuel cell may, for example, be a hydrogen/oxygen type fuel cell or a direct methanol type fuel cell (DMFC).

The method of operating a polymer electrolyte fuel cell of the present invention is a method of operating a polymer electrolyte fuel cell having the membrane/electrode assembly of the present invention and is an operation method of carrying out power generation by supplying an air at a relative humidity of at most 40% to the cathode while the temperature of the membrane/electrode assembly is maintained at 90° C. or higher.

When the relative humidity of the air to be supplied to the cathode is at most 40%, it is possible to downsize a humidifier.

When the temperature of the membrane/electrode assembly can be maintained at 90° C. or higher, it is easy to control the temperature of the cell, and in the case of cells for automobiles, it is possible to downsize a radiator. Further, in a case where hydrogen obtainable by reforming methanol, natural gas, gasoline or the like is used as a fuel gas on the anode side, if carbon monoxide is contained even in a trace amount, the catalyst will be poisoned, and the output of the polymer fuel cell tends to be low. However, when the temperature of the membrane/electrode assembly can be maintained at 90° C. or higher, poisoning of the catalyst can be suppressed. The temperature of the membrane/electrode assembly is preferably 120° C. or higher with a view to obtaining a higher effect of suppressing poisoning.

Liquid Composition

The liquid composition of the present invention is a dispersion liquid having a proton conductive polymer having an electrical conductivity of at least 0.07 S/cm at a temperature of 80° C. at a relative humidity of 40% and having a water content less than 150 mass %, dispersed in a dispersion medium containing an organic solvent having a hydroxyl group and water.

The organic solvent having a hydroxyl group is preferably an organic solvent having a main chain having from 1 to 4 carbon atoms, and it may, for example, be methanol, ethanol, n-propanol, isopropanol, tert-butanol or n-butanol. The organic solvent having a hydroxyl group may be used alone or as a mixture of two or more.

The proportion of water is preferably from 10 to 99 mass %, more preferably from 40 to 99 mass % in the dispersion medium (100 mass %). By increasing the proportion of water, the dispersibility of the proton conductive polymer in the dispersion medium will improve.

The proportion of the organic solvent having a hydroxyl group is preferably from 1 to 90 mass %, more preferably from 1 to 60 mass % in the dispersion medium (100 mass %).

The dispersion medium may contain a fluorinated solvent. The following compounds may be mentioned as examples of the fluorinated solvent.

Hydrofluorocarbons such as 2H-perfluoropropane, 1H,4H-perfluorobutane, 2H,3H-perfluoropentane, 3H,4H-perfluoro(2-methylpentane), 2H,5H-perfluorohexane and 3H-perfluoro(2-methylpentane); fluorocarbons such as perfluoro(1,2-dimethylcyclobutane), perfluorooctane, perfluoroheptane and perfluorohexane; hydrochlorofluorocarbons such as 1,1-dichloro-1-fluoroethane, 1,1,1-trifluoro-2,2-dichloroethane, 3,3-dichloro-1,1,1,2,2-pentafluoropropane and 1,3-dichloro-1,1,2,2,3-pentafluoropropane; fluoroethers such as 1H,4H,4H-perfluoro(3-oxapentane) and 3-methoxy-1,1,1,2,3,3-hexafluoropropane; and fluorinated alcohols such as 2,2,2-trifluoroethanol, 2,2,3,3,3-pentafluoro-1-propanol and 1,1,1,3,3,3-hexafluoro-2-propanol.

As a method of preparing the liquid composition, a method of applying shear force to the proton conductive polymer in the dispersion medium under atmospheric pressure or in a state hermetically sealed in e.g. an autoclave may be mentioned. The preparation temperature is preferably from 0 to 250° C., more preferably from 20 to 150° C. If necessary, shear force such as ultrasonic waves may be applied.

The proportion of the proton conductive polymer is preferably from 1 to 50 mass %, more preferably from 3 to 30 mass % in the liquid composition (100 mass %).

Now, the present invention will be described in further detail with reference to Examples. However, it should be understood that the present invention is by no means restricted to such specific Examples. Examples 1 to 8 are Preparation Examples, Examples 9 to 13, 19, 20 and 22 to 26 are Examples of the present invention, and Examples 14 to 18, 21, 27 and 28 are Comparative Examples.

(TQ Value)

The TQ value (unit: ° C.) indicates the molecular weight of a polymer and is a temperature at which the amount of a polymer extruded, becomes 100 mm$^3$/sec when melt extrusion is carried out under an extrusion pressure of 2.94 MPa by using a nozzle having a length of 1 mm and an inner diameter of 1 mm.

The amount of the polymer extruded was measured by changing the temperature by using a flow tester CFT-500A (manufactured by Shimadzu Corporation) to determine the TQ value at which the amount of the polymer extruded became 100 mm$^3$/sec.

(Ion Exchange Capacity)

The ion exchange capacity of a polymer was determined by the following method.

The polymer was immersed in a sodium hydroxide solution at a constant concentration comprising water and methanol as solvents and hydrolyzed, and the solution was subjected to back titration to determine the ion exchange capacity.

(Electrical Conductivity)

The electrical conductivity of a polymer was determined by the following method.

To a film having a width of 5 mm comprising the polymer, a substrate having four terminal electrodes disposed with a distance of 5 mm was closely contacted, and the resistance of the film was measured by a known four terminal method with an alternating current of 10 kHz at a voltage of 1 V under constant temperature and constant humidity conditions at a temperature of 80° C. under a relative humidity of 40%, to calculate the electrical conductivity from the result.

(Water Content)

The water content of a polymer was determined by the following method.

The polymer was immersed in warm water at 80° C. for 16 hours, and the polymer together with warm water was cooled to room temperature. The polymer was taken out from the water, water droplets attached to the surface were wiped off, and the mass of the polymer containing water was immediately measured. Then, the polymer was put in a glove box and left to stand in an atmosphere through which dry nitrogen flows for 24 hours or longer to dry the polymer. Then, the dry mass of the polymer was measured in the glove box. The mass of water absorbed by the polymer was determined from the difference between the mass of the polymer containing water and the dry mass, to determine the water content of the polymer from the following formula:

Water content={(mass of water absorbed by the polymer)/(dry mass of the polymer)}×100

Example 1

Compound (m11) was prepared by the following synthetic route.

(i) Preparation of Compound (s1)

Compound (s1) was prepared in the same manner as in the method disclosed in Example 1 of JP-A-2002-528433.

(ii) Preparation of Compound (a1)

To a 200 cm$^3$ autoclave, 300 g of compound (s1) was put, and oxidizing reaction was carried out by bubbling an oxygen gas while the internal temperature was maintained at from 100° C. to 101.5° C. Bubbling was terminated when the internal pressure of the autoclave increased to 1.0 MPa (gauge pressure) accompanying bubbling, and the internal temperature was lowered to 25° C. to purge the internal pressure.

Subsequently, the oxidizing reaction was repeatedly carried out until the ratio of the sum of areas in a spectrum attributable to fluorine atoms bonded to carbon-carbon unsaturated bonds relative to the sum of areas in a spectrum derived from all fluorine atoms bonded to carbon atoms in $^{19}$F-NMR spectrum of the solution in the autoclave becomes 0.05 or below to obtain compound (a1). The yield was 260 g.

(iii) Preparation of Compound (c1):

To a 200 cm$^3$ glass flask equipped with a stirrer, a dropping funnel and a Dimroth condenser, 6.4 g of potassium fluoride (tradename, Chloro-Catch F, manufactured by MORITA CHEMICAL INDUSTRIES, CO., LTD.) and 51 g of monoglime were put and stirred, and 20 g of compound (b11) was added dropwise from the dropping funnel while cooling to an internal temperature of from 5 to 10° C. After completion of dropwise addition, stirring was carried out for 30 minutes, and then 28 g of compound (a1) was added dropwise from the dropping funnel at from 10 to 20° C. After completion of the dropwise addition, stirring was carried out at 20° C. for 20 hours. After completion of the reaction, distillation under reduced pressure was carried out to obtain 43.2 g of compound (c1) as a fraction at 75° C./4 kPa (absolute pressure). The gas chromatography (hereinafter referred to as GC) purity was 98%.

(iv) Preparation of Compound (d1):

Into a 200 cm$^3$ stainless autoclave equipped with a stirrer and a pressure gauge, 1.2 g of potassium fluoride (tradename: Chloro-Catch F, manufactured by MORITA CHEMICAL INDUSTRIES, CO., LTD.), 9.6 g of monoglime and 92 g of compound (c1) were put, followed by stirring at from 5 to 10° C. for one hour, and then 33 g of hexafluoropropene oxide was continuously added under a pressure of 0.2 MPa (gauge pressure) or below. After stirring was continued for two hours, the reaction liquid was put in a separatory funnel to obtain 121 g of a fluorocarbon layer.

The fluorocarbon layer was subjected to distillation to obtain 86.6 g of compound (d1) as a fraction at 60° C./0.33 kPa (absolute pressure). The GC purity was 94%. The main by-product was a compound having 2 mols of hexafluoropropene oxide added.

(v) Preparation of Compound (m11):

Using a stainless steel tube with an inner diameter of 1.6 cm, a U-tube with a length of 40 cm was prepared. One end of the U-tube was filled with glass wool, and the other end was filled with glass beads with a stainless steel sintered metal as a perforated plate to prepare a fluidized bed type reactor. A nitrogen gas was used as a fluidizing gas so that raw materials could be continuously supplied by a metering pump. The outlet gas was collected using a trap tube with liquid nitrogen.

The fluidized bed type reactor was put in a salt bath, and 63 g of compound (d1) was supplied to the fluidized bed type reactor over a period of 3 hours so that the molar ratio of compound (d1)/$N_2$ would be 1/20 while the reaction temperature was maintained at 330° C. After completion of the reaction, 47.4 g of a liquid was obtained by the liquid nitrogen trap. The GC purity was 85%. The liquid was subjected to distillation to obtain 25 g of compound (m11) as a fraction at a boiling point of 66° C./0.67 kPa (absolute pressure). The GC purity was 99%.

$^{19}$F-NMR (282.7 MHz, solvent: $CDCl_3$, standard: $CFCl_3$) data of compound (m11).

δ(ppm): 46.3 (1F), 45.4 (1F), −79.1 (2F), −82.8 (2F), −106.7 (1F), −108.4 (1F), −112.3 (2F), −112.7 (dd, J=82.2 Hz, 66.9 Hz, 1F), −118.5 (2F), −121.3 (dd, J=112.7 Hz, 82.2 Hz, 1F), −136.2 (ddt, J=112.9 Hz, 67.1 Hz, 6.0 Hz, 1F), −140.2 (1F).

Example 2

Compound (m12) was prepared by the following synthetic route:

(i) Preparation of Compound (a2):

Compound (a2) was prepared in the same manner as in the method as disclosed in Example 2 of JP-A-57-176973.

(ii) Preparation of Compound (c2):

To a 300 cm³ four-necked round bottom flask equipped with a Dimroth condenser, a thermometer, a dropping funnel and a glass rod with an agitating blade, 1.6 g of potassium fluoride (tradename: Chloro-Catch F, manufactured by MORITA CHEMICAL INDUSTRIES CO., LTD.) and 15.9 g of dimethoxyethane were put in a nitrogen atmosphere. Then, the round bottom flask was cooled in an ice bath, and 49.1 g of compound (b11) was added dropwise from the dropping funnel over a period of 32 minutes at an internal temperature of at most 10° C. After completion of the dropwise addition, 82.0 g of compound (a2) was added dropwise from the dropping funnel over a period of 15 minutes. Substantially no increase in the internal temperature was observed. After completion of the dropwise addition, the internal temperature was recovered to room temperature, followed by stirring for about 90 minutes. The lower layer was recovered by a separatory funnel. The recovered amount was 127.6 g, and the GC purity was 55%. The recovered liquid was put in a 200 cm³ four-necked round bottom flask, followed by distillation to obtain 97.7 g of compound (c2) as a fraction at a degree of vacuum of from 1.0 to 1.1 kPa (absolute pressure). The GC purity was 98%, and the yield was 80%.

(iii) Preparation of Compound (d2):

To a 200 cm³ autoclave made of stainless steel, 1.1 g of potassium fluoride (tradename: Chloro-Catch F, manufactured by MORITA CHEMICAL INDUSTRIES CO., LTD.) was put. After deaeration, 5.3 g of dimethoxyethane, 5.3 g of acetonitrile and 95.8 g of compound (c2) were put in the autoclave under reduced pressure. Then, the autoclave was cooled in an ice bath, 27.2 g of hexafluoropropene oxide was added over a period of 27 minutes at an internal temperature of from 0 to 5° C., and the internal temperature was recovered to room temperature with stirring, followed by stirring overnight. The lower layer was recovered by a separatory funnel. The recovered amount was 121.9 g, and the GC purity was 63%. The recovered liquid was subjected to distillation to obtain 72.0 g of compound (d2) as a fraction at a boiling point of 80 to 84° C./0.67 to 0.80 kPa (absolute pressure). The GC purity was 98%, and the yield was 56%.

(iv) Preparation of Compound (m12):

In the same manner as in (v) in Example 1, 34.6 g of compound (d2) was supplied to the fluidized bed type reactor over a period of 1.5 hours at a reaction temperature of 340° C. After completion of the reaction, 27 g of a liquid was obtained by the liquid nitrogen trap. The GC purity was 84%. The liquid was subjected to distillation to obtain compound (m12) as a fraction at a boiling point of 69° C./0.40 kPa (absolute pressure). The GC purity was 98%.

$^{19}$F-NMR (282.7 MHz, solvent: $CDCl_3$, standard: $CFCl_3$) data of compound (m12).

δ(ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9 (1F).

Example 3

Compound (m13) was prepared by the following synthetic route:

(c2)

(m13)

To a 2,000 mL four-necked flask equipped with a thermometer, a Dimroth condenser and a stirrer, 677 g of diglyme was put in a nitrogen atmosphere. Then, while stirring the content in the flask, 23.33 g (402 mmol) of potassium fluoride was added. A dropping funnel was attached to the flask, and the flask was cooled in an ice bath. 191.02 g (363 mmol) of compound (c2) was added dropwise from the drooping funnel over a period of 30 minutes. During the dropwise addition, the internal temperature was from 2.7 to 6.4° C. Stirring was continued for 2 hours while the flask was cooled in an ice bath.

Then, 88.55 g (385 mmol) of $CF_2$=$CFOSO_2F$ was added dropwise from the dropping funnel over a period of 40 minutes. During the dropwise addition, the internal temperature was from 0.9 to 3.4° C. Stirring was continued for 3 hours while the flask was cooled in an ice bath, and stirring was further continued overnight at room temperature. The reaction liquid was subjected to filtration, and the lower layer between separated two phases was recovered to obtain 218 g (purity: 71.7%) of crude product. Then, by distillation under reduced pressure, compound (m13) was obtained as a fraction at a boiling point of 105 to 106° C./1.3 to 1.5 kPa, with an insulation yield of 45%.

$^{19}$F-NMR (282.7 MHz, solvent: $CDCl_3$, standard: $CFCl_3$) data of compound (m13).

δ(ppm): 45.5 (1F), 45.1 (1F), −72.1 (2F), −79.6 (2F), −82.4 (4F), −82.9 (2F), −90.3 (1F), −104.2 (1F), −112.5 (2F), −112.7 (2F), −145.2 (1F), −190.8 (1F).

Example 4

Preparation of Polymer P1

To a 100 cm$^3$ stainless steel autoclave, 53.81 g of compound (m11), 10.30 g of compound (2-1) as a solvent and 6.5 mg of compound (3-1) as an initiator were put, and cooled with liquid nitrogen, and the autoclave was deaerated:

$$CClF_2CF_2CHClF \quad (2-1),$$

$$(CH_3)_2C(CN)N=NC(CH_3)_2(CN) \quad (3-1).$$

The internal temperature was raised to 67° C., tetrafluoroethylene was introduced to the autoclave, and the pressure was adjusted at 1.23 MPaG (gauge pressure). Polymerization was carried out for 10.0 hours while the temperature and the pressure were maintained constant. Then, the autoclave was cooled to terminate the polymerization, and the gas in the system was purged. The reaction liquid was diluted with compound (2-1), and compound (2-2) was added to coagulate the polymer, followed by filtration.

$$CH_3CCl_2F \quad (2-2)$$

The polymer was stirred in compound (2-1), and compound (2-2) was added to re-coagulate the polymer, followed by filtration. The polymer was dried under reduced pressure at 80° C. overnight to obtain polymer P1 which is a copolymer of tetrafluoroethylene with compound (m11). The yield, the ion exchange capacity and the TQ value are shown in Table 1.

Example 5

Preparation of Polymer P2

Tetrafluoroethylene and compound (m11) were copolymerized to obtain polymer P2 in the same manner as in Example 4 except that the conditions were changed to conditions as identified in Table 1. The yield, the ion exchange capacity and the TQ value are shown in Table 1. As the initiator, compound (3-2) was used:

$$(CH_3)_2CHOC(=O)OOC(=O)OCH(CH_3)_2 \quad (3-2)$$

Example 6

Preparation of Polymer P3

Tetrafluoroethylene and compound (m12) were copolymerized to obtain polymer P3 in the same manner as in Example 4 except that the conditions were changed to conditions as identified in Table 1. The yield, the ion exchange capacity and the TQ value are shown in Table 1.

Example 7

Preparation of Polymer P4

Tetrafluoroethylene and compound (m12) were copolymerized to obtain polymer P4 in the same manner as in Example 4 except that the conditions were changed to conditions as identified in Table 1. The yield, the ion exchange capacity and the TQ value are shown in Table 1.

Example 8

Preparation of Polymer P5

Tetrafluoroethylene and compound (m13) were copolymerized to obtain polymer P5 in the same manner as in Example 4 except that the conditions were changed to conditions as identified in Table 1. The yield, the ion exchange capacity and the TQ value are shown in Table 1. As the initiator, compound (3-3) was used:

(3-3)

TABLE 1

|  | Ex. 4 | Ex. 5 | Ex. 6 | Ex. 7 | Ex. 8 |
|---|---|---|---|---|---|
| Autoclave (cm$^3$) | 100 | 30 | 30 | 30 | 30 |
| Compound (m1) (g) | m11 | m11 | m12 | m12 | m13 |
|  | 53.81 | 8.99 | 9.84 | 11.8 | 25.08 |

TABLE 1-continued

|  | Ex. 4 | Ex. 5 | Ex. 6 | Ex. 7 | Ex. 8 |
|---|---|---|---|---|---|
| Compound (2-1) (g) | 10.30 | 7.35 | 3.09 | 5.58 | 0 |
| Type of initiator | 3-1 | 3-2 | 3-1 | 3-1 | 3-3 |
| Amount of initiator added (mg) | 6.5 | 7.7 | 1.3 | 1.8 | 5.4 |
| Polymerization temperature (° C.) | 67 | 40 | 70 | 65 | 80 |
| Pressure (MPaG) | 1.23 | 0.54 | 1.31 | 1.11 | 0.14 |
| Polymerization time (hr.) | 10.0 | 4.8 | 5.7 | 9.0 | 9.0 |
| Precursor polymer | P1 | P2 | P3 | P4 | P5 |
| Yield (g) | 11.4 | 1.51 | 1.2 | 2.1 | 1.43 |
| Ion exchange capacity (meq/g dry resin) | 1.86 | 1.51 | 1.63 | 1.51 | 1.48 |
| TQ value (° C.) | 237 | 310 | 225 | 270 | 191 |

Example 9

(i) Preparation of Film of Polymer Q1

Polymer P1 was treated by the following method to obtain a film of acid form polymer Q1.

First, polymer P1 was formed into a film with a thickness of from 100 to 200 μm by press molding at the TQ temperature of polymer P1.

Then, the above film was immersed in an aqueous solution containing 30 mass % of dimethyl sulfoxide and 15 mass % of potassium hydroxide at 80° C. for 16 hours to hydrolyze —$SO_2F$ groups in the film thereby to convert these groups to —$SO_3K$ groups.

Then the above film was immersed in a 3 mol/L hydrochloric acid aqueous solution at 50° C. for 2 hours. The hydrochloric acid aqueous solution was exchanged, and the same treatment was further carried out four times. The film was sufficiently washed with deionized water to obtain a film of polymer Q1 having —$SO_3K$ groups in the film converted to sulfonic acid groups.

The electrical conductivity and the water content of polymer Q1 were measured. The results are shown in Table 2.

(ii) Preparation of Liquid Composition S1

To polymer Q1, a solvent mixture of ethanol, water and 1-butanol (ethanol/water/1-butanol=35/50/15 mass ratio) was added to adjust the solid content concentration to 15 mass %, and the mixture was stirred at 125° C. for 8 hours in an autoclave. Water was further added to adjust the solid content concentration to 9 mass % to obtain liquid composition S1 having polymer Q1 dispersed in a dispersion medium. The composition of the dispersion medium was ethanol/water/1-butanol=21/70/9 (mass ratio).

Example 10

(i) Preparation of Film of Polymer Q2

A film of acid form polymer Q2 was obtained in the same manner as in Example 9 except that polymer P2 was used instead of polymer P1.

The electrical conductivity and the water content of polymer Q2 were measured. The results are shown in Table 2.

(ii) Preparation of Liquid Composition S2

Liquid composition S2 was obtained in the same manner as in Example 9 except that polymer Q2 was used instead of polymer Q1.

Example 11

(i) Preparation of Film of Polymer Q3

A film of acid form polymer Q3 was obtained in the same manner as in Example 9 except that polymer P3 was used instead of polymer P1.

The electrical conductivity and the water content of polymer Q3 were measured. The results are shown in Table 2.

(ii) Preparation of Liquid Composition S3

Liquid composition S3 was obtained in the same manner as in Example 9 except that polymer Q3 was used instead of polymer Q1.

Example 12

(i) Preparation of Film of Polymer Q4

A film of acid form polymer Q4 was obtained in the same manner as in Example 9 except that polymer P4 was used instead of polymer P1.

The electrical conductivity and the water content of polymer Q4 were measured. The results are shown in Table 2.

(ii) Preparation of Liquid Composition S4

Liquid composition S4 was obtained in the same manner as in Example 9 except that polymer Q4 was used instead of polymer Q1.

Example 13

(i) Preparation of Film of Polymer Q5

A film of acid form polymer Q5 is obtained in the same manner as in Example 9 except that polymer P5 is used instead of polymer P1.

The electrical conductivity and the water content of polymer Q5 are measured. The results are shown in Table 2.

(ii) Preparation of Liquid Composition S5

Liquid composition S5 is obtained in the same manner as in Example 9 except that polymer Q5 is used instead of polymer Q1.

TABLE 2

|  | Ex. 9 | Ex. 10 | Ex. 11 | Ex. 12 | Ex. 13 |
|---|---|---|---|---|---|
| Precursor polymer | P1 | P2 | P3 | P4 | P5 |
| Proton conductive polymer | Q1 | Q2 | Q3 | Q4 | Q5 |
| Electrical conductivity (S/cm) | 0.11 | 0.09 | 0.10 | 0.09 | 0.08 |
| Water content (mass %) | 129 | 75 | 105 | 72 | 68 |
| Liquid composition | S1 | S2 | S3 | S4 | S5 |

Example 14

(i) Preparation of Polymer P10

Tetrafluoroethylene and compound (1-1) were copolymerized in accordance with Example 1 of JP-A-60-243292 to obtain polymer P10. The ion exchange capacity and the TQ value are shown in Table 3:

$$CF_2=CFOCF_2CF_2SO_2F \quad (1\text{-}1)$$

(ii) Preparation of Film of Polymer Q10

Polymer P10 was subjected to conversion to an acid form in the same manner as in the case of polymer P1 in Example 9 to obtain a film of acid form polymer Q10. The electrical conductivity and the water content of polymer Q10 were measured. The results are shown in Table 3.

Example 15

(i) Preparation of Polymer P11

Tetrafluoroethylene and compound (1-1) were copolymerized in the same manner as in Example 14 to obtain polymer P11. The ion exchange capacity and the TQ value are shown in Table 3.

(ii) Preparation of Film of Polymer Q11

Polymer P11 was subjected to conversion to an acid form in the same manner as in the case of polymer P1 in Example 9 to obtain a film of acid form polymer Q11. The electrical conductivity and the water content of polymer Q11 were measured. The results are shown in Table 3.

Example 16

(i) Preparation of Polymer P12

Tetrafluoroethylene and compound (1-2) were copolymerized to obtain polymer P12. The ion exchange capacity and the TQ value are shown in Table 3:

$$CF_2=CFOCF_2CF(CF_3)OCF_2CF_2SO_2F \quad (1\text{-}2)$$

(ii) Preparation of Film of Polymer Q12

Polymer P12 was subjected to conversion to an acid form in the same manner as in the case of polymer P1 in Example 9 to obtain a film of acid form polymer Q12. The electrical conductivity and the water content of polymer Q12 were measured. The results are shown in Table 3.

(iii) Preparation of Liquid Composition S12

To polymer Q12, a solvent mixture of ethanol and water (ethanol/water=60/40 mass ratio) was added to adjust the solid content concentration to 26 mass %, and the mixture was stirred at 100° C. for 8 hours in an autoclave to obtain liquid composition S12 having polymer Q12 dispersed in a dispersion medium.

Example 17

(i) Preparation of Polymer P13

Tetrafluoroethylene and compound (1-2) were copolymerized to obtain polymer P13. The ion exchange capacity and the TQ value are shown in Table 3.

(ii) Preparation of Film of Polymer Q13

Polymer P13 was subjected to conversion to an acid form in the same manner as in the case of polymer P1 in Example 9 to obtain a film of acid form polymer Q13. The electrical conductivity and the water content of polymer Q13 were measured. The results are shown in Table 3.

Example 18

(i) Preparation of Polymer P14

Tetrafluoroethylene and compound (1-2) were copolymerized to obtain polymer P14. The ion exchange capacity and the TQ value are shown in Table 3.

(ii) Preparation of Film of Polymer Q14

Polymer P14 was subjected to conversion to an acid form in the same manner as in the case of polymer P1 in Example 9 to obtain a film of acid form polymer Q14. The electrical conductivity and the water content of polymer Q14 were measured. The results are shown in Table 3.

(iii) Preparation of Liquid Composition S14

To polymer Q14, a solvent mixture of ethanol and water (ethanol/water=60/40 mass ratio) was added to adjust the solid content concentration to 26 mass %, and the mixture was stirred at 100° C. for 8 hours in an autoclave to obtain liquid composition S14 having polymer Q14 dispersed in a dispersion medium.

TABLE 3

|  | Ex. 14 | Ex. 15 | Ex. 16 | Ex. 17 | Ex. 18 |
|---|---|---|---|---|---|
| Precursor polymer | P10 | P11 | P12 | P13 | P14 |
| Ion exchange capacity (meq/g dry resin) | 1.41 | 1.53 | 1.50 | 1.44 | 1.10 |
| TQ value (° C.) | 375 | 297 | 247 | 229 | 230 |
| Proton conductive polymer | Q10 | Q11 | Q12 | Q13 | Q14 |
| Electrical conductivity (S/cm) | 0.06 | 0.08 | 0.12 | 0.07 | 0.04 |
| Water content (mass %) | 127 | 291 | 496 | 196 | 66 |
| Liquid composition | — | — | S12 | — | S14 |

Example 19

Liquid composition S14 was applied to a sheet made of a copolymer of ethylene with tetrafluoroethylene (AFLEX 100N, tradename, manufactured by Asahi Glass Company, Limited, thickness: 100 μm) (hereinafter referred to as an ETFE sheet) by a die coater and dried at 80° C. for 30 minutes and further annealed at 150° C. for 30 minutes to form a polymer electrolyte membrane with a thickness of 25 μm.

126 g of water was added to 20 g of a catalyst having 50 mass % of platinum supported on a carbon black powder, and ultrasonic waves were applied for 10 minutes to obtain a catalyst dispersion liquid. To the catalyst dispersion liquid, 80 g of liquid composition S1 was added, and 54 g of ethanol was further added to adjust the solid content concentration to 10 mass % to obtain a liquid for forming a catalyst layer. The liquid was applied to another ETFE sheet and dried to form a catalyst layer having a platinum amount of 2.2 mg/cm$^2$.

The ETFE sheet was separated from the polymer electrolyte membrane, and the polymer electrolyte membrane was sandwiched between two such catalyst layers, followed by hot pressing at a pressing temperature of 150° C. for a pressing time of 5 minutes under a pressure of 3 MPa to bond the catalyst layers to both sides of the polymer electrolyte membrane, and then the ETFE film was separated from each catalyst layer to obtain a membrane/catalyst layer assembly having an electrode area of 25 cm$^2$. The membrane/catalyst layer assembly was subjected to heat treatment at 190° C. in a nitrogen atmosphere to stabilize the proton conductive polymer in the catalyst layers.

On a gas diffusion layer made of carbon paper, a carbon layer comprising carbon and polytetrafluoroethylene was formed.

The membrane/catalyst layer assembly was sandwiched between such gas diffusion layers so that the carbon layers and the catalyst layers were in contact, to obtain a membrane/electrode assembly.

The membrane/electrode assembly was assembled into a cell for power generation, and hydrogen (utilization ratio: 50%) and air (utilization ratio: 50%) were supplied under elevated pressure of 200 kPa (absolute pressure) to the anode and to the cathode, respectively, while the temperature of the membrane/electrode assembly was maintained at 80° C. The cell voltages at a current density of 1.0 A/cm$^2$ when hydrogen and air were humidified to relative humidities of 50%, respectively, and when hydrogen and air were humidified to relative humidities of 50% and 0%, respectively (low humidity conditions) were recorded. The results are shown in Table 4.

Example 20

A membrane/electrode assembly was obtained and evaluated in the same manner as in Example 19 except that liquid composition S3 was used instead of liquid composition S1 to form the catalyst layers. The results are shown in Table 4.

Example 21

A membrane/electrode assembly was obtained and evaluated in the same manner as in Example 19 except that liquid composition S14 was used instead of liquid composition S1 to form the catalyst layers. The results are shown in Table 4.

TABLE 4

|  | Anode (hydrogen) relative humidity: 50% Cathode (air) relative humidity: 50% | Anode (hydrogen) relative humidity: 50% Cathode (air) relative humidity: 0% |
|---|---|---|
| Ex. 19 | 0.62 V | 0.59 V |
| Ex. 20 | 0.60 V | 0.56 V |
| Ex. 21 | 0.58 V | 0.40 V |

Example 22

A membrane/electrode assembly was obtained in the same manner as in Example 19 except that liquid composition S3 was used instead of liquid composition S14 to form the polymer electrolyte layer.

The membrane/electrode assembly was assembled into a cell for power generation, and hydrogen (utilization ratio: 50%) and air (utilization ratio: 50%) were supplied under elevated pressure of 200 kPa (absolute pressure) to the anode and to the cathode, respectively, while the temperature of the membrane/electrode assembly was maintained at 95° C. The cell voltages at a current density of 1.0 A/cm² when hydrogen and air were humidified to relative humidities of 30%, respectively, and when hydrogen and air were humidified to relative humidities of 30% and 0%, respectively (low humidity conditions) were recorded. The results are shown in Table 5.

Example 23

A membrane/electrode assembly is obtained and evaluated in the same manner as in Example 22 except that liquid composition S2 is used instead of liquid composition S1 to form the catalyst layers. The results are shown in Table 5.

Example 24

A membrane/electrode assembly was obtained and evaluated in the same manner as in Example 22 except that liquid composition S3 was used instead of liquid composition S1 to form the catalyst layers. The results are shown in Table 5.

Example 25

A membrane/electrode assembly was obtained and evaluated in the same manner as in Example 22 except that liquid composition S4 was used instead of liquid composition S1 to form the catalyst layers. The results are shown in Table 5.

Example 26

A membrane/electrode assembly is obtained and evaluated in the same manner as in Example 22 except that liquid composition S5 is used instead of liquid composition S1 to form the catalyst layers. The results are shown in Table 5.

Example 27

A membrane/electrode assembly was obtained and evaluated in the same manner as in Example 22 except that liquid composition S12 was used instead of liquid composition S1 to form the catalyst layers. The results are shown in Table 5.

Example 28

A membrane/electrode assembly was obtained and evaluated in the same manner as in Example 22 except that liquid composition S14 was used instead of liquid composition S1 to form the catalyst layers. The results are shown in Table 5.

TABLE 5

|  | Anode (hydrogen) relative humidity: 30% Cathode (air) relative humidity: 30% | Anode (hydrogen) relative humidity: 30% Cathode (air) relative humidity: 0% |
|---|---|---|
| Ex. 22 | 0.54 V | 0.47 V |
| Ex. 23 | 0.41 V | 0.32 V |
| Ex. 24 | 0.50 V | 0.33 V |
| Ex. 25 | 0.40 V | 0.31 V |
| Ex. 26 | 0.40 V | 0.30 V |
| Ex. 27 | Voltage not stabilized | 0.25 V |
| Ex. 28 | 0.33 V | No power generation conducted |

By use of the membrane/electrode assembly of the present invention, such advantages can be obtained that a humidifier, etc. can be simplified, that a radiator can be downsized by power generation at a temperature higher than conventional one, and that the output can be increased by decreasing poisoning of a catalyst by a trace amount of carbon monoxide contained in a reformed hydrogen gas.

The entire disclosure of Japanese Patent Application No. 2006-287789 filed on Oct. 23, 2006 including specification, claims, drawings and summary is incorporated herein by reference in its entirety.

What is claimed is:

1. A membrane/electrode assembly for a polymer electrolyte fuel cell, comprising an anode and a cathode each having a catalyst layer containing a fluoropolymer, and a polymer electrolyte membrane disposed between the anode and the cathode, wherein the fluoropolymer has an electrical conductivity of at least 0.07 S/cm at a temperature of 80° C. at a relative humidity of 40% and has a water content less than 150 mass %, and wherein the fluoropolymer has repeating units having a fluorinated structure having a group represented by the following formula (α):

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, X is an oxygen atom, a nitrogen atom or a carbon atom, wherein a is 0 when X is an oxygen atom, a is 1 when X is a nitrogen atom and a is 2 when X is a carbon atom, and Y is a fluorine atom or a monovalent perfluoroorganic group.

2. The membrane/electrode assembly for a polymer electrolyte fuel cell according to claim 1, wherein the fluoropolymer has an electrical conductivity of at least 0.08 S/cm at a temperature of 80° C. at a relative humidity of 40%.

3. The membrane/electrode assembly for a polymer electrolyte fuel cell according to claim 1, wherein the fluoropolymer also has tetrafluoroethylene repeating units.

4. The membrane/electrode assembly for a polymer electrolyte fuel cell according to claim 1, wherein the perfluoroalylene group in $Q^1$ is linear.

5. The membrane/electrode assembly for a polymer electrolyte fuel cell according to claim 1, wherein the perfluoroalylene group in $Q^1$ is branched.

6. The membrane/electrode assembly for a polymer electrolyte fuel cell according to claim 1, wherein the perfluoroalylene groups independently have 1 to 6 carbon atoms.

7. The membrane/electrode assembly for a polymer electrolyte fuel cell according to claim 1, wherein at least one of $Q^1$ and $Q^2$ is a $C_{1-6}$ perfluoroalkylene goup having an etheric oxygen atom.

8. A polymer electrolyte fuel cell comprising the membrane/electrode assembly of claim 1.

9. The polymer electrolyte fuel cell according to claim 8, wherein the fluoropolymer has an electrical conductivity of at least 0.08 S/cm at a temperature of 80° C. at a relative humidity of 40%.

10. A method of generating power, comprising supplying an air to the cathode of the polymer electrolyte fuel cell of claim 8.

11. The method of claim 10, wherein the air has a relative humidity of at most 40%.

12. The method of claim 10, wherein the temperature of the membrane/electrode assembly is maintained at 90° C. or higher.

13. The method of claim 10, wherein the air has a relative humidity of at most 40% and wherein the temperature of the membrane/electrode assembly is maintained at 90° C. or higher.

14. A method of assembling the membrane/electrode assembly for a polymer electrolyte fuel cell of claim 1, comprising assembling the anode, cathode and polymer electrolyte membrane disposed between the anode and the cathode.

* * * * *